No. 761,891.

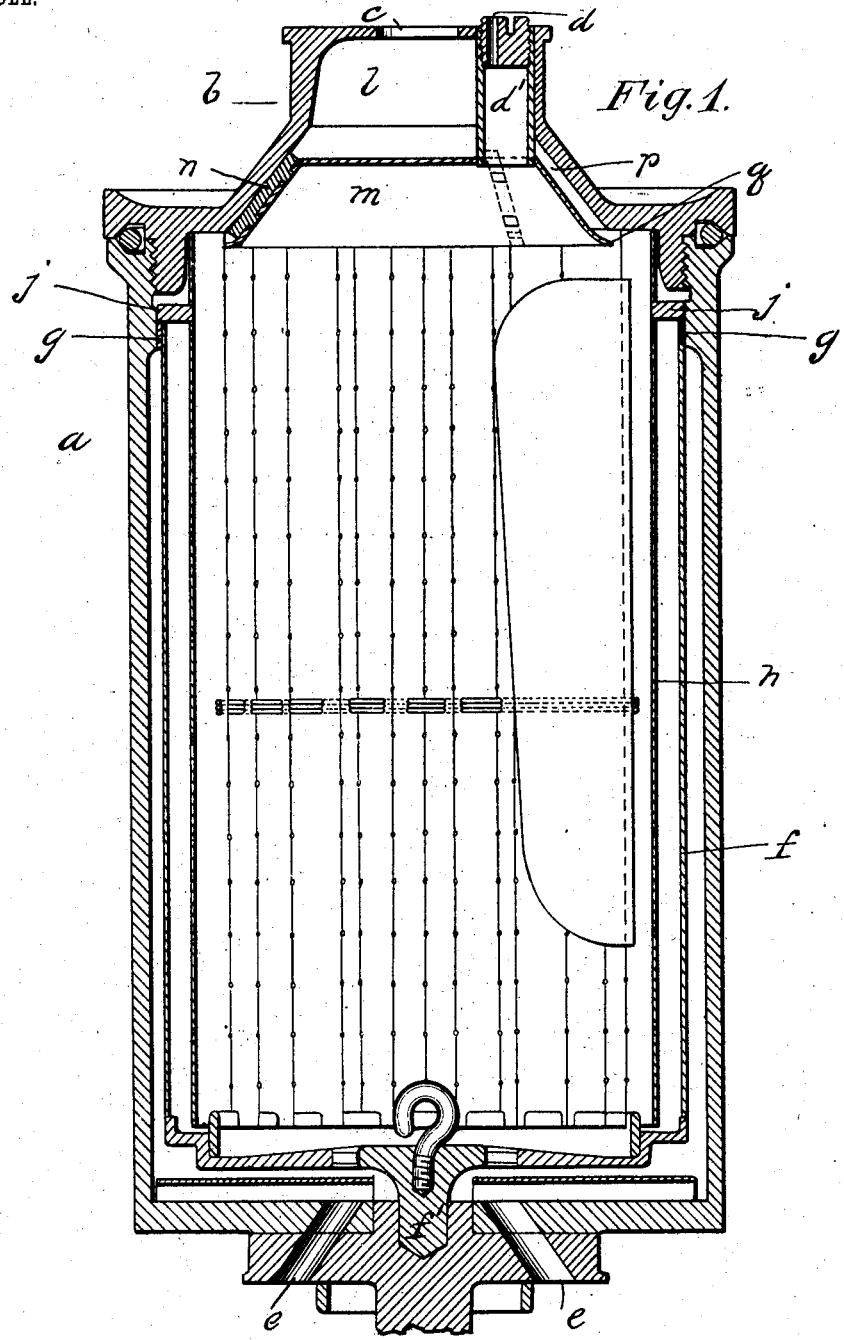

Patented June 7, 1904.

UNITED STATES PATENT OFFICE.

PERLEY L. KIMBALL, OF BELLOWS FALLS, VERMONT, ASSIGNOR TO VERMONT FARM MACHINE COMPANY, OF BELLOWS FALLS, VERMONT, A CORPORATION.

CENTRIFUGAL CREAM-SEPARATOR.

SPECIFICATION forming part of Letters Patent No. 761,891, dated June 7, 1904.

Application filed February 11, 1904. Serial No. 193,071. (No model.)

*To all whom it may concern:*

Be it known that I, PERLEY L. KIMBALL, a citizen of the United States of America, residing at Bellows Falls, in the county of Windham and State of Vermont, have invented certain new and useful Improvements in Centrifugal Cream-Separators, of which the following is a specification.

The object of the invention is the production of an apparatus for separating mixed fluids of different densities notably for separating the cream from the so-called "blue" milk, as the two are contained together in what is known as "full" milk.

The apparatus is hereinafter described as applied to cream separation.

In the drawings, Figure 1 is a central vertical section of a separator embodying my invention. Fig. 2 is a detail view of a modification.

The letter *a* denotes the separator-body.

The letter *b* denotes the separator-cover, which may be secured to the body by a threaded flange and a suitable packing-ring between the cover and body. The cover is preferably dome-shaped, provided with a central inlet *c* for the introduction of the full milk and the adjustable non-central outlet *d* for the outflow of cream. The blue milk escapes at the bottom of the bowl through the outlet *e*.

*f* denotes the outer liner, supported at foot, as by the pintle *f'*, entering a recess in the base, and at its upper end by the ring *g*, which contacts with the inner surface of the bowl.

*h* denotes the inner liner, located within the outer liner and is supported thereby at its lower end. At or near its upper end it is provided with a ring *j* or equivalent devices which contacts with the inner surface of the separator-bowl. It is thus seen that both the inner and outer liners are supported by and positively positioned with respect to the separator body or bowl.

As is well known, devices of this sort when in use are rotated at several thousand turns a minute, and it is essential that the inner parts be maintained in proper alinement and position with respect to the bowl, so as to avoid as much as possible any tendency of throwing the device out of balance. This object is attained to a considerable extent by the method of supporting the inner liner, as above set forth.

In the dome-shaped cover there is formed a compartment *l*, into which the full milk is delivered. A cone *m*, closed at its upper end, forms a bottom to the chamber *l* and is secured to the cover by suitable means, as the spacing-blocks *n*, forming an annular passage *p* between the cover and this cone. The lower edge of the cone is outwardly curved, as at *q*, and lies adjacent to but within the upper end of the inner liner.

The full milk in the chamber *l* flows down over the wall of the cone in a thin film or lamina, and as it strikes the outwardly-turned lower edge it is thrown directly out onto the skimming-surface of the inner liner, thus subjecting the milk at the earliest possible moment to the skimming action of the separator and taking advantage of the greatest possible length of skimming-surface of the liner.

Preferably there are three spacing-blocks used to support the cone in the cover. These may take the form of a solid block, as shown in Fig. 1, or the shouldered pins *n'* shown in Fig. 2 may be used. This method of conducting the full milk to the separating-chamber has many advantages over separators heretofore made which have this general method of operation—for instance, the one shown in my Patent No. 720,154 of February 10, 1903. The use of the plate permits me to have the cover construction lighter than by any former construction, thus lowering the center of gravity of the complete separator and tending to insure its more perfect balance when in operation.

The whole milk as it is fed into the chamber *l* falls upon the flat surface of the cone *m* and there spreads out equally into a very thin film and flows down over the expanding walls of the cone, which not only causes the milk to take on the whirling motion of the bowl, but also causes the film to become thinner as the diameter of the cone enlarges, so that when it is delivered to the inner liner it is in the best form to receive the fullest action of the separating elements of the bowl, whereby the separation is more complete than by any of the old methods of feeding full milk. Furthermore, by this improved construction there is a clear open space between the cover and the cone which permits of much more thorough and easy cleaning, which is essential in machines of this class. It is to be noted that this cone is strictly a feeding device for conducting the full milk to the separating-chamber in the most advantageous way.

The non-central outlet $d$ for the cream comprises a tube $d'$, which passes through the plate closing the upper end of the cone and through the upper wall of the cover. It has a liquid-tight connection both at the cone and at the cover and is supplied at its upper end with a rotatable plug eccentrically pierced. The cream collecting under the cone passes out through this tube.

I claim as my invention—

1. In a centrifugal separator the bowl, and the liners located in said bowl one within the other, said liners being supported independently of one another at their upper ends by the inner wall of the separator-bowl, substantially as described.

2. In a centrifugal separator the combination with the bowl and the liners located therein one within the other, of spacing devices by means of which each liner is supported independently of the other at its upper end by the separator-bowl.

3. In a centrifugal separator the combination with the bowl and the liners located therein one within the other, of a ring secured to the upper end of each liner, said rings having contact with the inner wall of the separator-bowl.

4. In a centrifugal separator the bowl, the cover therefor, and the feed-cone supported by the cover, the lower edge of said cone being outwardly flared, substantially as described.

5. In a centrifugal separator the bowl, the cover therefor, the feed-cone closed at its top, and spacing devices between said cover and said feed-cone forming an annular passage therebetween.

6. In a cream-separator the bowl, the cover therefor, the chamber in said cover, and the feed-cone supported in the cover and forming substantially annular conduits from said chamber to the separating-compartment of the bowl.

7. In a centrifugal separator the combination with the bowl, and the cover therefor, having a chamber, of a feed-cone supported by said cover and forming an annular conduit from said chamber to the separating-compartment in the bowl, said cone being closed at its upper end, and a tube having a liquid-tight connection through the closed end of said cone and passing through the top of said cover, substantially as described.

8. In a cream-separator the combination with the bowl, and the liners located therein one within the other, and supported thereby both at bottom and top, of a cover adapted to be secured to said bowl independently of said liners, and a feed-cone having a plain surface, and spacing-blocks supporting said feed-cone in said cover and forming an annular passage between said parts, substantially as described.

In testimony whereof I affix my signature in presence of two witnesses.

PERLEY L. KIMBALL.

Witnesses:
　Geo. H. Muzzey,
　R. C. Bidwell.